United States Patent

[11] 3,582,788

[72] Inventor Francesco Castagna
Milan, Italy
[21] Appl. No. 724,882
[22] Filed Apr. 29, 1968
[45] Patented June 1, 1971
[73] Assignee Societa Italiana Telecomunicazioni Siemens S.p.A.
Milan, Italy
[32] Priority May 2, 1967
[33] Italy
[31] 15618A

[54] TELECOMMUNICATION SYSTEM WITH AUTOMATIC VOLUME CONTROL
10 Claims, 5 Drawing Figs.

[52] U.S. Cl. .......... 325/62, 325/65, 325/392, 343/228
[51] Int. Cl. .......... H04b 1/00
[50] Field of Search .......... 325/41, 42, 1, 2, 52, 56, 62, 65, 390, 391, 392, 393, 407, 408, 410, 144, 187; 343/177, 227, 228, 225; 178/70

[56] References Cited
UNITED STATES PATENTS

| | | | |
|---|---|---|---|
| 3,182,137 | 5/1965 | Beatty .......... | 325/62 UX |
| 3,271,679 | 9/1966 | Fostoff .......... | 325/62 X |
| 3,390,335 | 6/1968 | Miyagi .......... | 325/56 |
| 3,415,952 | 12/1968 | Blackburn et al. .......... | 325/62 X |
| 3,449,525 | 6/1969 | Berry et al. .......... | 325/62 X |
| 3,456,191 | 7/1969 | Rodenburg et al. .......... | 325/41 X |

*Primary Examiner*—Robert L. Griffin
*Assistant Examiner*—R. S. Bell
*Attorney*—Karl F. Ross

ABSTRACT: Multichannel telephone system with transmission of pilot frequency to control the gain of an amplifier at a remote terminal by comparison of a reference voltage with a control voltage proportional to pilot amplitude, the pilot frequency being switchable between zero and a relatively low normal amplitude level for signaling in the absence of voice-frequency transmission and between this low level and an abnormally high level for signaling during such transmission; the changeover from normal to abnormal level triggers a compensating circuit which reduces the control voltage at the comparator input or increases the magnitude of the reference voltage to maintain the gain control independent of the pilot level.

INVENTOR:
Francesco Castagna
BY Karl F. Ross
ATTORNEY

Francesco Castagna
INVENTOR.
BY Karl F. Ross
ATTORNEY

Francesco Castagna
INVENTOR.

BY Karl F. Ross
ATTORNEY

TELECOMMUNICATION SYSTEM WITH AUTOMATIC VOLUME CONTROL

My present invention relates to a telecommunication system in which two terminals, e.g. telephone exchanges, are interconnected by a trunk line or other path adapted for the transmission of message and switching signals within a predetermined frequency band. Thus, the invention is particularly applicable to multichannel communication systems wherein telephone calls or other messages from different subscribers can be concurrently transmitted over the same path (cable or radio link) by modulation upon different carrier frequencies.

In such a system it is frequently necessary to transmit switching signals, e.g. for calling, selection, response or disconnect purposes, together with the voice frequencies or other message signals transposed into the assigned frequency bank; this may be done with the aid of a special constant-frequency oscillation located either within or outside the sideband used for message transmission. It is also desirable to use a fixed pilot frequency, transmitted over the same path, for automatic volume control at the receiving end to compensate for changes in signal strength due to varying operating conditions.

The presence of either of these constant frequencies within the operating sideband entails the risk of overloading the receiving amplifier or amplifiers. On the other hand, their transmission outside the message band requires a more elaborate filtering system and an increased bandwidth of the receiver.

It is, therefore, the general object of my present invention to simplify the signaling and volume-control equipment of such a communication system by allowing the use of a single pilot frequency for both purposes. A more particular object of my invention is to provide means in such system for enabling utilization of this common pilot oscillation both in the busy and in the idle condition of the transmission path or of a specific communication channel thereof.

According to an important feature of my present invention, I provide signaling means at the transmitting terminal connected to vary the output of a pilot-frequency oscillator between a (generally lower) normal level and a (generally higher) abnormal level, the difference between these two levels exceeding the range of amplitude variations to which an associated gain-control circuit at the receiving terminal responds in offsetting fortuitous variations in signal strength. The switchover to the abnormal level at the transmitting terminal causes a similar jump in the amplitude of the incoming pilot oscillation at the receiving terminal from a first range to a second range, with consequent actuation of a relay or equivalent switch means to perform a compensatory readjustment of the operation of the gain-control circuit which now responds to amplitude variations within the new range. Thus, the gain-control circuit is made to react in substantially identical manner to amplitude excursions of the pilot with reference to the mean of either of these two amplitude ranges.

There are, in principle, two ways in which I can achieve this readjustment of a basically conventional gain-control circuit which includes a comparator having one input connected to a source of constant reference voltage and another input connected to a detector deriving a unipolar control voltage from the amplitude of the pilot. Thus, I may modify either the control voltage or the reference voltage so as to obtain the same voltage difference $\Delta V$ in the output of the comparator in the presence of like deviations of the control voltage from the mean of one or the other amplitude range. For this purpose it is merely necessary to insert an impedance network in series with the corresponding comparator input and to vary the effective impedance of this network in response to a triggering of the level-sensitive switch means.

With this arrangement it is possible to alternate, for signaling purposes, between a lower and a higher pilot level without materially affecting the operation of the automatic volume control at the remote terminal. In particular, a series of brief switchovers to the higher level may be used to transmit dial pulses upon a seizure of the channel by a station initiating a call, followed if necessary by further pulses (e.g. time or rate signals) during the ensuing conversation.

According to another feature of this invention, means may be provided at the transmitting terminal for selectively interrupting the pilot to enable signaling whenever it is not desirable to shift to the higher pilot level, as when the channel is idle. Since an idle channel does not require automatic volume control, the interruption of the pilot under these conditions is permissible. Such interruption may be used, for example, to signal the release of the channel upon termination of a call.

The invention will be described in greater detail hereinafter with reference to the accompanying drawing in which.

Figure 1:
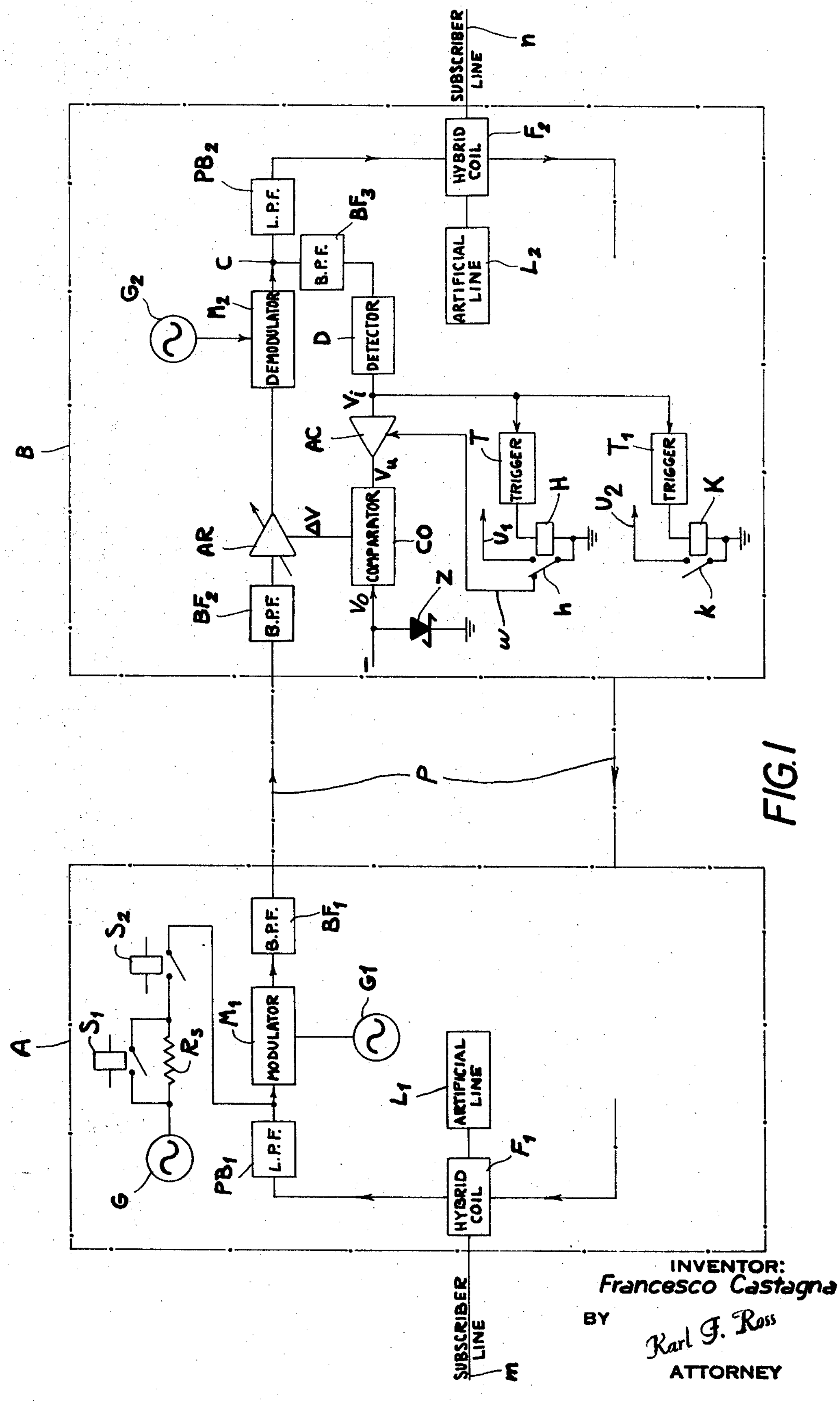
FIG. 1 is an overall circuit diagram of a telecommunication system embodying the invention.

Reference will first be made to FIG. 1 which shows a pair of terminals A, B interconnected by a two-way transmission path P such as a multichannel coaxial cable or radio link. Only the circuitry used for transmission from A to B will be described in detail; the identical equipment for transmission in the opposite direction has been illustrated only in part.

A subscriber line *m* at terminal A is connected, through a hybrid coil $F_1$, to the incoming and outgoing branches of its channel; a similar hybrid coil $F_2$ is assigned at terminal B to a subscriber line *n*. The two hybrid coils are terminated by respective artificial lines $L_1$, $L_2$. The outgoing branch at terminal A includes a low-pass filter $PB_1$ for voice frequencies, a modulator $M_1$ receiving the output of this filter and a fixed carrier frequency from an oscillation generator $G_1$ individual to this channel, and a band-pass filter $BF_1$ selecting a sideband from the modulator output for transmission to terminal B. The incoming branch at the latter terminal includes another band-pass filter $BF_2$ and a variable-gain amplifier AR applying the output of this filter to a demodulator $M_2$ which also receives a channel carrier, identical with the one generated by oscillator $G_1$, from an oscillation generator $G_2$. The demodulated voice frequencies traverse a low-pass filter $PB_2$ on their way to hybrid coil $F_2$ and subscriber line *n*.

In accordance with conventional practice, another fixed-frequency oscillator G supplies a pilot which passes the modulator $M_1$, the filters $BF_1$ and $BF_2$, the amplifier AR and the demodulator $M_2$ together with the voice frequencies from filter $PB_1$ and is then branched off at a point *c*, ahead of filter $PB_2$, to a narrow band-pass filter $BF_3$ working into a detector D. The unipolar output of the detector constitutes a control voltage $V_i$ applied to the input of a direct-current amplifier AC which delivers an output voltage $V_u$ to one input of a comparator CO; the other input of this comparator is energized by a source of direct current supplying a reference voltage $V_o$ of predetermined magnitude stabilized by a Zener diode Z.

Comparator CO feeds back to amplifier AR a corrective voltage $\Delta V$ which adjusts the gain of this amplifier, as by modifying the bias of a diode in its input, to offset changes in operating conditions which affect the strength of the signals received at terminal B.

In accordance with the present invention, the output of pilot-frequency generator G passes through a resistor $R_s$ adapted to be short-circuited by an armature of a signaling relay $S_1$; resistor $R_s$ lies in series with an armature of another signaling relay $S_2$. A part of the output of detector D is deviated to a pair of trigger circuits T and $T_1$ connected in parallel, these circuits serving for the respective energization of two relays H and K with armatures *h* and *k*. Armature *h* normally grounds a control lead *w* of amplifier AC and, when attracted, switches this ground to a first output lead $u_1$; armature *k*, in the operated condition of relay K, similarly grounds a second output lead $u_2$.

Trigger $T_1$ responds to the presence of control voltage $V_i$ regardless of the magnitude of that voltage and, therefore, of the amplitude of the pilot frequency applied to modulator $M_1$ at terminal A. Trigger T has a higher threshold and responds only when voltage $V_i$ reaches a magnitude corresponding to an elevated abnormal level of the pilot existing upon a short-circuiting of resistor $R_s$ by energization of signaling relay $S_1$. Thus, with relay $S_1$ and $S_2$ both unoperated in the idle condition of the channel, armature *h* of relay H grounds the lead *w* while leads $u_1$ and $u_2$ will be open-circuited.

If a call is initiated by the subscriber station connected to line *m*, relay $S_2$ is energized to apply the attenuated output of oscillator G as a low-level pilot oscillation to the outgoing line of path P. Relay K responds at terminal B, its armature *k* grounding the lead $u_2$ to operate equipment, not shown, for marking the channel busy. Thereafter, relay $S_1$ is intermittently energized for brief periods, e.g. of several milliseconds each, to short out the resistor $R_s$ so as to generate switching pulses which actuate the relay H and ground the lead $u_1$. Concurrently, for the duration of the operation of relays $S_1$ and H, the effective gain of DC amplifier AC is sharply reduced by the same ratio by which the output voltage $V_i$ of detector D is stepped up as a result of the increase in pilot level. Thus, the comparator CO receives an unchanged control voltage $V_u$ and matches it against the reference voltage $V_o$, its own output voltage $\Delta V$ being 0 when the two voltages are equal.

Upon the cessation of any switching pulse with the release of relay $S_1$, relay H is also deactivated and its armature *h* restores the previous condition.

At the end of the conversation, relay $S_2$ is released to signal the idle condition of the channel. This operation removes the pilot frequency from the line and releases the relay K whose armature *k* deenergizes the lead $u_2$ to restore the equipment which had responded to the grounding of the lead upon seizure of the channel.

Figure 2:
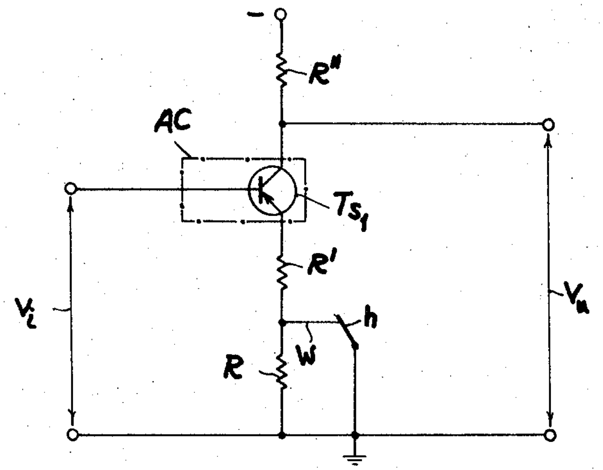
FIG. 2 is a more detailed diagram of a relay-controlled switchover circuit forming part of the system of FIG. 1.

FIG. 2 shows details of the control of amplifier AC by relay armature *h*. The amplifier is here seen to include, as its final stage, a PNP transistor $Ts_1$ connected between ground and negative potential in series with an emitter resistance R' and a collector resistance R''. Resistance R' is in series with a further resistor R normally short-circuited by armature *h*. Upon the reversal of this armature, and with suitable choice of the resistances involved, the output voltage $V_u$ of the amplifier goes sharply negative as compared with the value it would otherwise assume, this drop exactly compensating for the jump in the input voltage V*i* which led to the energization of the relay H of FIG. 1.

In lieu of an electromagnetic relay, as illustrated in FIGS. 1 and 2, I may provide purely electronic means for instantly effecting this compensatory switchover with virtual elimination of all transients. This has been illustrated in FIG. 3 where the transistor $Ts_1$ has its emitter in series with two resistors $R_1$ and $R_2$ bridged by a voltage divider consisting of three series resistors $R_3$, $R_4$ and $R_5$', the output voltage $V_u$ being developed across the resistor combination $R_4$, $R_5$. A second PNP transistor $Ts_2$ has its input connected across resistor $R_2$ and its output connected across resistor $R_5$. As long as the input voltage $V_i$ is at a relatively low level, corresponding to the normal amplitude range of the incoming pilot, the voltage drop across resistor $R_2$ is small and transistor $Ts_2$ is cut off. When, however, voltage $V_i$ is stepped up in response to a switching pulse, transistor $Ts_2$ saturates and virtually short circuits resistor $R_5$ so that, with proper proportioning of the several resistors, output voltage $V_u$ stays at its previous value.

Figure 4:
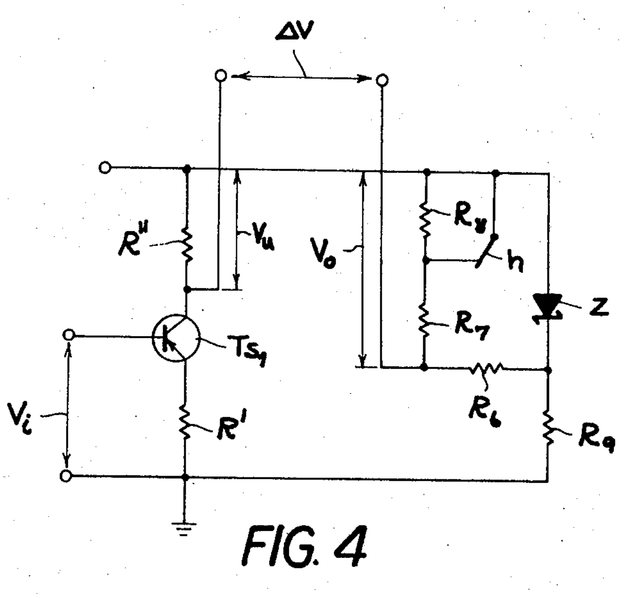
FIG. 4 is a further diagram illustrating a modification of the relay-controlled switchover circuit of FIG. 2.

According to FIG. 4, where the final amplifier stage $Ts_1$ is connected in the same way as in FIG. 2, Zener diode Z lies in series with a resistor $R_9$ and is shunted by a voltage divider $R_6$, $R_7$ and $R_8$, the last-mentioned resistor being normally short-circuited by the armature *h* which is here shown connected to negative potential rather than ground. The reference voltage $V_o$ is developed between the negative bus bar and the junction of resistors $R_6$, $R_7$ while the control voltage $V_u$ is measured between this bus bar and the collector of transistor $Ts_1$. Upon a reversal of armature *h*, resistor $R_8$ becomes effective to increase the magnitude of $V_o$ by the same ratio by which the voltage drop $V_u$ across the collector resistance R'' has been stepped up through the increase in input voltage $V_i$; thus, the voltage difference $\Delta V$ remains again unaffected by the change in pilot level.

Figure 5:
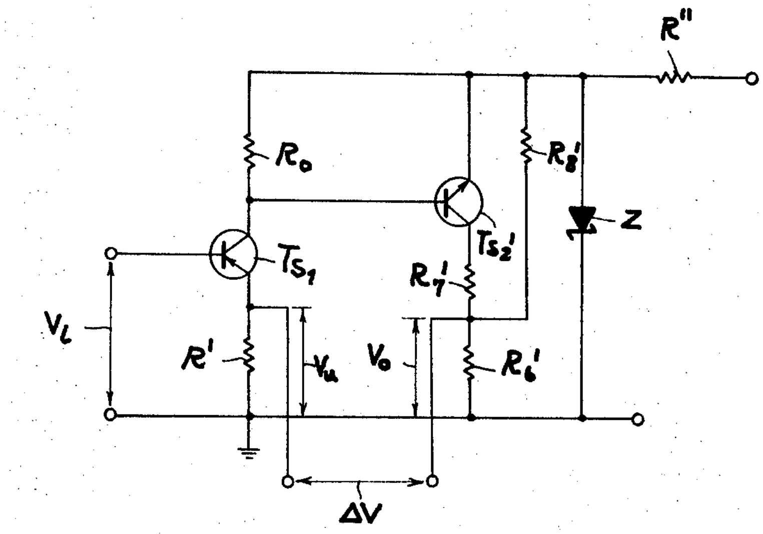
FIG. 5 is still another diagram illustrating a modification of the electronically controlled switchover circuit of FIG. 3.

FIG. 5 illustrates another electronic switchover circuit wherein the Zener diode Z, lying here in series with emitter resistor R'', is shunted by a voltage divider $R_6'$, $R_8'$; resistor $R_8'$ is bridged across the series combination of a transistor $Ts_2'$ of NPN type and an associated collector resistor $R_7'$. A resistor $R_0$, in series with resistor R'', is connected in the base-emitter circuit of transistor $TS_2'$ which is normally cut off but conducts and saturates upon a jump of input voltage $V_i$ to a magnitude corresponding to the abnormal pilot level, thereby effecting connecting the resistor $R_7'$ in parallel with resistor $R_8'$ so that the junction of these two branches with resistor $R_6'$ becomes more negative, thus balancing the increase in the negative potential of the emitter of transistor $Ts_1$. The rise in reference voltage $V_o$, developed between this junction and ground, matches the increase in the control voltage $V_u$ measured across resistor R'; the difference voltage $\Delta V$, present between the emitter of transistor $Ts_1$ and the junction of resistors $R_6'$, $R_7'$, $R_8'$, is thereby maintained constant in the face of the step-up of voltage $V_i$.

Figure 3:
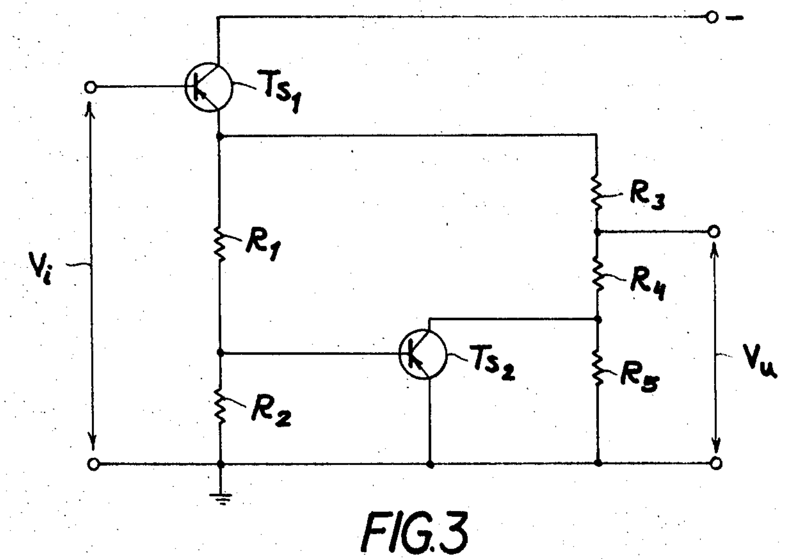
FIG. 3 is a diagram similar to FIG. 2, showing an electronically operated switchover circuit.

The voltage dividers R, R' and $R_3$, $R_4$, $R_5$ of FIGS. 2 and 3 may be regarded as adjustable attenuators in the output circuit of amplifier AC and, in effect, constitute means for varying the gain of this amplifier between two predetermined values.

If both the normal and the abnormal amplitude level of the pilot oscillation are low enough, its frequency may be included within the band of voice frequencies passed by the filter $PB_2$ of FIG. 1; otherwise the pilot frequency should be located outside the message band, e.g. in the position of the carrier. Even in the latter case there exists no danger of overloading since the elevated pilot level subsists for only brief periods.

In the electronic switchover arrangement of FIG. 3 or 5, in which the armature *h* is not utilized, the relay H (FIG. 1) may be retained as a repeater of the switching pulses generated by relay $S_1$ or may be replaced by an equivalent electronic signal repeater, the same being of course true of relay K. Naturally, relays $S_1$ and $S_2$ could also be replaced by equivalent electronic circuitry.

It will be noted that the circuits of FIGS. 4 and 5 develop the difference voltage $\Delta V$ directly, thus without the need for a separate comparator such as the unit CO of FIG. 1. This comparator, however, may nevertheless be included for the purpose of transforming the floating potential difference of FIGS. 4 and 5 into a variable voltage of like or proportional magnitude measured with reference to ground or some other fixed potential for easier utilization in controlling the gain of amplifier AR.

These and other modifications, readily apparent to persons skilled in the art, are intended to be embraced within the spirit and scope of my invention as defined in the appended claims.

I claim:

1. In a telecommunication system having a first terminal, a second terminal, a transmission channel linking said terminals, means at said first terminal for modulating a carrier with message signals to be transmitted over said channel within a predetermined frequency band, means including a variable-gain amplifier at said second terminal for demodulating said carrier to reconstitute said message signals, oscillator means at said first terminal for generating a constant-frequency pilot oscillation within said band for transmission over said channel, and volume-control means at said second terminal including a control element in said channel for regulating the effective output of said amplifier in response to variations in the amplitude of the incoming pilot oscillation, the combination therewith of:

signaling means at said first terminal connected to vary the output of said oscillator means between a normal level and an abnormal level, the difference between said levels exceeding the range of amplitude variations from said normal level to be offset by said volume-control means;

switch means at said second terminal connected to said channel at a point beyond said element and responsive to changes in said incoming pilot oscillation from a first amplitude range corresponding to said normal level to a second amplitude range corresponding to said abnormal level;

signal-repeating means at said second terminal controlled by said switch means;

and compensating means at said second terminal controlled by said switch means for readjusting said volume-control means to respond in substantially identical manner to amplitude excursions of said pilot oscillation with reference to the mean of either of said amplitude ranges.

2. The combination defined in claim 1 wherein said volume-control means comprises detector means for deriving a unipolar control voltage from the amplitude of said incoming pilot oscillation, a source of constant reference voltage, and comparison means having two inputs connected to receive said control voltage and said reference voltage, respectively; said compensating means including an impedance network in series with one of said inputs and switchover means for modifying the effective impedance of said network.

3. The combination defined in claim 2 wherein said network includes a voltage divider, said switchover means being connected across a section of said voltage divider for optionally short-circuiting same.

4. The combination defined in claim 2 wherein said network includes a voltage divider with a pair of parallel branches, said switchover means being connected in series with one of said branches for optionally open-circuiting same.

5. The combination defined in claim 2 wherein said switchover means comprises a relay and voltage-sensitive trigger means connected to said detector means for operating said relay.

6. The combination defined in claim 5 wherein said relay is provided with an armature forming part of said switch means.

7. The combination defined in claim 2 wherein said switchover means comprises a first transistor and a normally cutoff second transistor connected to be driven to saturation by said first transistor.

8. The combination defined in claim 2 wherein said compensating means comprises a direct-current amplifier provided with an output circuit including said network.

9. The combination defined in claim 2 wherein said source of reference voltage includes a Zener diode, said network being connected at least in part across said Zener diode.

10. The combination defined in claim 1 wherein said abnormal level is higher than said normal level, said signaling means being effective in a busy condition of said channel, further comprising other signaling means at said first terminal effective in an idle condition of said channel for selectively interrupting said pilot frequency and other switch means at said second terminal responsive to interruption of said pilot frequency for carrying out switching operations indicated by said other signaling means.